United States Patent [19]
Rist

[11] Patent Number: 5,499,914
[45] Date of Patent: Mar. 19, 1996

[54] KIT FOR FORMING A THREE-DIMENSIONAL DECORATIVE ITEM

[76] Inventor: Pamela J. Rist, 1200 Ironwood, Normal, Ill. 61761

[21] Appl. No.: 404,515

[22] Filed: Mar. 15, 1995

Related U.S. Application Data

[62] Division of Ser. No. 194,696, Feb. 10, 1994, Pat. No. 5,437,829.

[51] Int. Cl.$^6$ .............................. B29C 33/42; B26B 3/00
[52] U.S. Cl. ............................ 425/470; 30/316; 425/298
[58] Field of Search ................................ 425/298, 403, 425/470, 472, DIG. 57; 30/315, 316; 206/575

[56] References Cited

U.S. PATENT DOCUMENTS

| | | | |
|---|---|---|---|
| 2,612,123 | 9/1952 | Nord | 425/298 |
| 2,691,337 | 10/1954 | Forrest | 425/470 |
| 2,694,644 | 11/1954 | Knab, Sr. | 426/512 |
| 3,296,956 | 1/1967 | Turner | 99/439 |
| 4,065,581 | 12/1977 | Helderpriem | 426/138 |
| 4,312,825 | 1/1982 | Chronberg | 264/153 |
| 4,664,928 | 5/1987 | McCaffrey | 426/503 |
| 4,789,555 | 12/1988 | Judd | 426/503 |
| 5,088,598 | 2/1992 | Iguchi | 206/575 |

*Primary Examiner*—Robert B. Davis
*Attorney, Agent, or Firm*—Marshall, O'Toole, Gerstein, Murray & Borun

[57] ABSTRACT

A kit and method for forming a decorative, three-dimensional object in which a die or template initially forms a two-dimensional sheet of material, following which the sheet, which is larger in size than the size of a three-dimensional mold, is placed in the three-dimensional mold. The material thereafter hardens to form a three-dimensional member such as a pastry shell.

5 Claims, 2 Drawing Sheets

KIT FOR FORMING A THREE-DIMENSIONAL DECORATIVE ITEM

This is a Divisional of U.S. application Ser. No. 08/194,696, filed Feb. 10, 1994 and know U.S. Pat. No. 5,437,829.

The present invention relates to a kit and method for forming a three-dimensional, self-supporting object from a material having a plastic stage and a hardened stage.

BACKGROUND OF THE INVENTION

It is frequently desirable to bake pastry-type food items which have decorative appearances. During the Christmas season, for example, it is common to make cookies or other pastries having the shapes of Christmas trees, stars, birds, angels, and other shaped objects symbolic of the Christmas season. It is also common to make pastry items having the shape of various flowers and the like. A common method for making such decorative pastry items is to prepare an appropriate dough which is rolled into a sheet-like material. Thereafter, the sheet is cut with a conventional cookie cutter or the like to obtain a two-dimensional dough image having an exterior silhouette of a desired object. Food coloring often is blended into or applied to the dough surface prior to or after baking to give the configured pastry item a desired coloring.

It is also known that three-dimensional pastry items can be made by manually molding dough in its plastic stage, into a desired shape. For example, the dough first may be rolled into a conventional sheet and, thereafter, the edge portions of the sheet folded upwardly, for example, around a center in order to give the appearance of a flower.

The conventional method of baking a decorative pastry item also can be used to form decorative clay items. For example, a suitable clay having a plastic stage can be molded into a desired shape, and thereafter dried to reach a hardened stage. Some types of clay can be molded while in the plastic stage and allowed to dry and harden at room temperature, whereas other clays are hardened by application of heat.

It is frequently desirable to make three-dimensional decorative items which have elevated portions extending horizontally outward of a central portion. For example, an item with the appearance of a flower can be made with petals extending upward around the center portion with the elevated ends of the petals extending horizontally outward. Decorative items having such a shape generally cannot be made by manually molding dough or clay in a plastic stage because the weight of the material causes the horizontally extending elevated ends to droop downward before the material hardens.

It would be desirable to provide a system for making a three-dimensional, self-supporting object with elevated portions which can be made of a pastry dough or clay material which will be retained in the desired shape while the object is being dried or baked.

Moreover, it is desired that a device be available for supplying the necessary amount of material to a three-dimensional mold whereby the material can readily rest on the mold and thereafter take the appropriate set in the three-dimensional mold. It is important, however, that neither too little nor too much dough, clay or material to be shaped be added to the mold. Finally, it is desired that the three-dimensional shape be molded in a relatively efficient and expeditious manner.

SUMMARY OF THE INVENTION

The invention disclosed and claimed herein serves to achieve the desired advantages for a molded, self-supporting, decorative three-dimensional item. The claimed invention serves to permit the molding of a three-dimensional shape utilizing the optimum amount of material and a procedure whereby the desired self-supporting, three-dimensional shape can be achieved relatively readily and efficiently.

The system employs a kit having at least one template or die and at least one three-dimensional mold. The template or die serves to provide a two-dimensional shape of the desired image or shape which ultimately will be molded as a three-dimensional object. For example, if it is desired to make a three-dimensional, self-supporting pastry shell having a bird-like shape into which a fruit, meat or vegetable filling will be placed, the flat template or die will be used initially to provide a two-dimensional blank of a bird-like shape. The template or die is adapted to sit on or be pressed into a sheet of pastry dough. A pastry dough blank having an exterior shape of a bird is cut out and removed from the dough sheet.

A second mold, which has a three-dimensional shape involving length, width and depth and an exterior shape which preferably is identical or substantially identical to the shape of the template or die, then is employed. The dough blank is placed over the three-dimensional mold, the blank being oriented so that the exterior shape of the mold and blank are substantially aligned. The blank initially sits on top of the three-dimensional mold and thereafter either collapses or is manually manipulated to seat within the three-dimensional mold whereby the exterior shape of the dough blank and the exterior portion of the mold are substantially aligned along their respective exterior edges.

Once the blank is seated properly, the blank and mold are placed in an oven and heated in a conventional manner. Upon removal from the oven, the pastry which has a three-dimensional, self-supporting, bird-like shape is removed from the mold.

The invention contemplates that, if desired, a single blank can be cut from a sheet, or if desired, a plurality of blanks can be simultaneously formed. Thereafter, the blanks can be placed in one or more three-dimensional molds for hardening.

These and other advantages will become more apparent from the accompanying drawings and detailed description.

DETAILED DESCRIPTION OF THE DRAWINGS

A better understanding of the present invention will be had by reading of the detailed description of the preferred embodiment taken in conjunction with the drawings wherein.

DETAILED DESCRIPTION

In one embodiment of the invention, a suitable mass of pastry dough is prepared in a conventional manner. The moldable dough has the texture of a putty-like substance in that it is in a plastic stage wherein it can be molded into a desired shape and will substantially retain the shape for some period of time. Typically, however, where the portions of the dough are permitted to extend outward from a mold or the like as a cantilever, the dough generally does not retain its shape, but, rather, the distal end of the cantilever droops.

Figure 1:
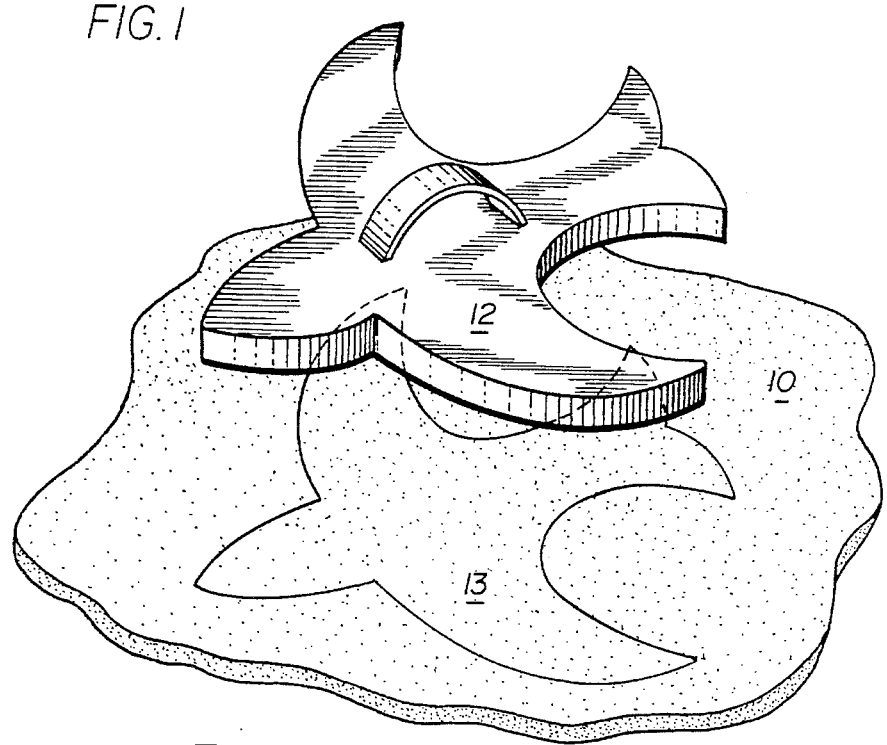
FIG. 1 shows a perspective view of a sheet of dough having a blank cut therefrom by a cutting die which provides a blank having an exterior shape of a bird.

Referring to FIG. 1, the making of a pastry item in accordance with the present invention involves the rolling of dough into sheet 10 using a common rolling pin to flatten the dough. After rolling, the dough mass preferably has a relatively flat sheet shape having a thickness of approximately ⅛ inch to ¾ inch, the thickness depending on the type of pastry or decorative item to be baked. Thereafter, a formed sheet shape or cutout, referred to herein as a blank, is made by use of a template or die forming member. FIG. 1 shows sheet 10 and dough cutting die 12 having a bird-like shape. Die 12 is pressed into sheet 10 to form blank 13. The die either will simply cut blank 13 or, in some instances, it will cut and remove blank 13 as die is withdrawn from sheet 10. If blank 13 remains within sheet 10, excess dough extending around the exterior of the formed dough shape is removed leaving blank 13 with the desired exterior ornamental shape, in this particular instance, the shape of a bird. In baking, such dies are typically referred to as a cookie cutter, and accordingly, the die will be referred to as a cookie cutter hereinafter.

Figure 2:
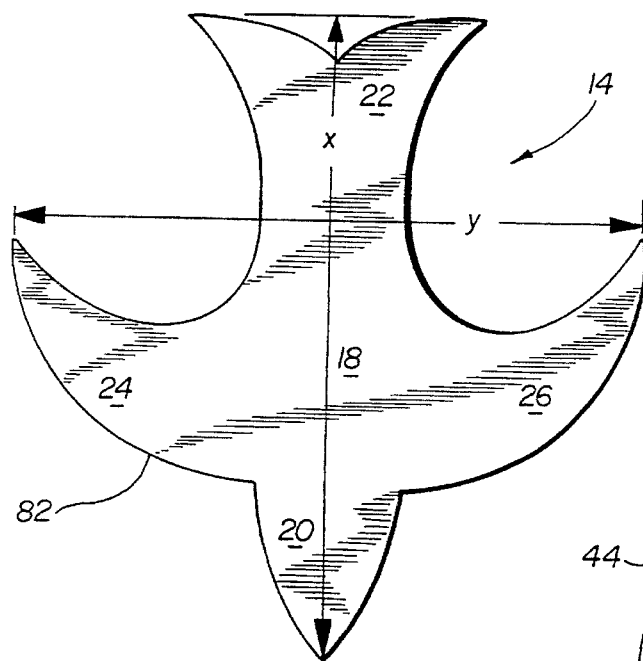
FIG. 2 shows a top view of a template adapted to cut a blank from a sheet of dough or other material.

Referring to FIG. 2, a blank also can be cut to the desired shape by use of template 14 which is placed upon the upper surface of the dough sheet 10 with the blank being scribed initially in dough sheet 10. Subsequently, excess material disposed about the exterior of blank 13 is removed with a knife or other suitable device. Blank 13 will have the same exterior shape as the image of template 14. As can be seen in FIG. 2, template 14 will form a blank comprising interior surface 6 and exterior surface 8, central portion 18, head 20, tail 22 and a plurality of projections or wings 24, 26 extending laterally outward from central portion 18.

Figure 3:
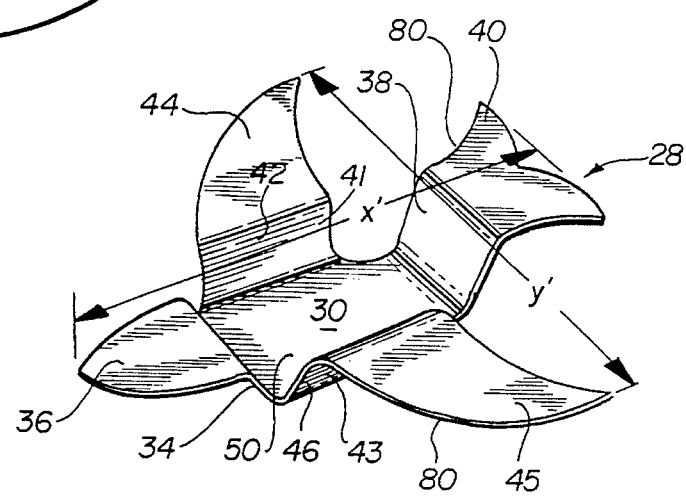
FIG. 3 shows an isometric view of a three-dimensional mold for receiving the dough cutout or blank formed by the die shown in FIG. 1 or the template shown in FIG. 2.
Figure 4:
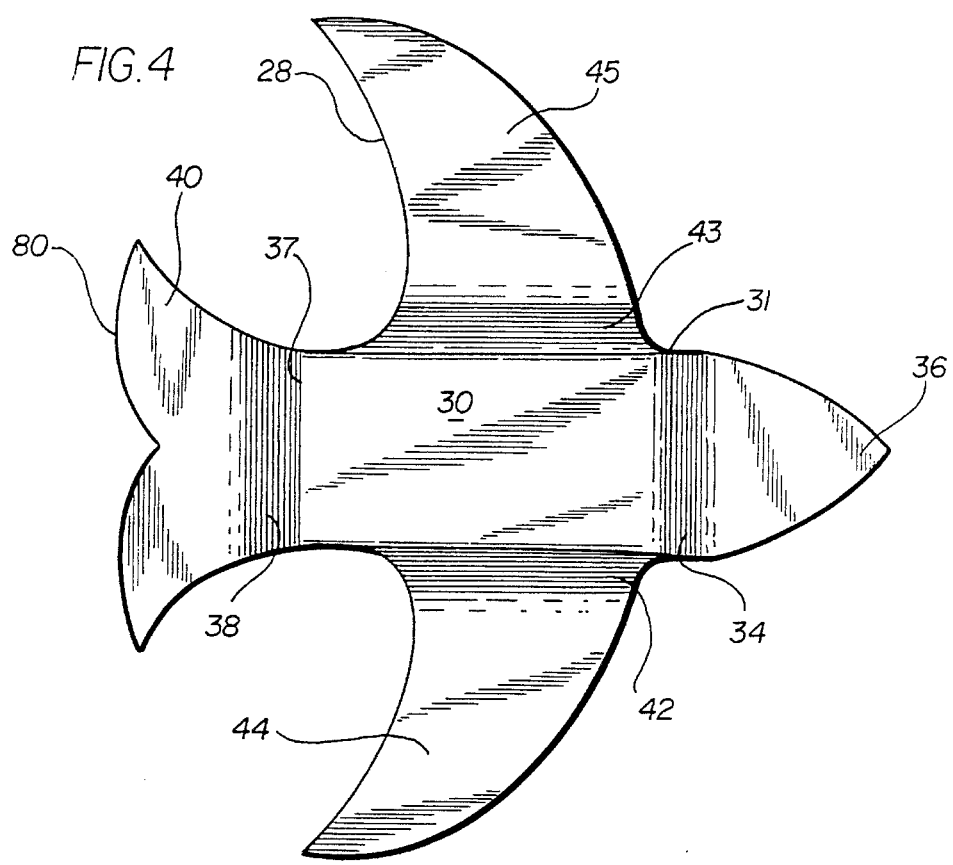
FIG. 4 shows a top view of the mold shown in FIG. 3.
Figure 5:
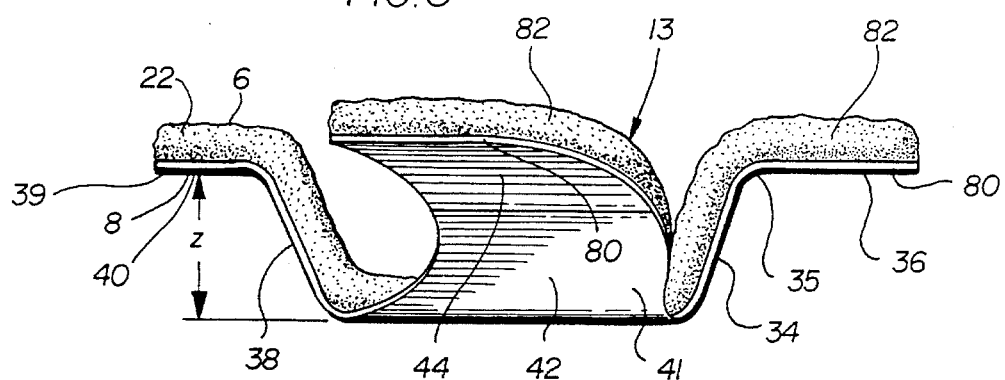
FIG. 5 shows a side view of the mold shown in FIG. 3 with a blank positioned in the mold; and, FIG. 6 shows a perspective view of a three-dimensional, self-supporting decorative pastry removed from the mold.

Referring to FIG. 3, each blank 13 thereafter is placed upon a three-dimensional mold 28 suitably shaped to receive blank 13. As can be seen in FIGS. 4 and 5, mold 28 includes central portion 30, which is substantially planar and suitable for maintaining the mold 28 in an erect position while resting upon a flat surface such as a cookie sheet, table, or portion of an oven. At one end 31 of central portion 30 is a mold portion shaped to resemble the head 20 of the bird. It includes an upwardly angled portion 34.

At the upper end 35 of portion 34, a substantially horizontal elevated portion 36 extends outwardly. At the opposite end 37 of portion 30, a mold portion 40 is shaped to receive bird tail 22 of the bird. Portion 40 extends outwardly from upwardly angled portion 38. In similar fashion, on each of the two sides of mold 28, portions 41 and 46 each have an upwardly angled portion 42 and 43, respectively, and generally horizontal elevated portions 44, 45 shaped as bird wings extend outwardly for receiving bird wings 24, 26 on blank 13.

In the embodiment of FIG. 3, mold 28 is depicted to receive a single blank 13; however, it should be appreciated that a plurality of dies 12 or templates 14 could be utilized to simultaneously cut a plurality of blanks 13. Each blank 13 thereafter could be placed in a plurality of molds 28 whereby a plurality of cookies, pastry, etc. could be made at one time.

Figure 6:
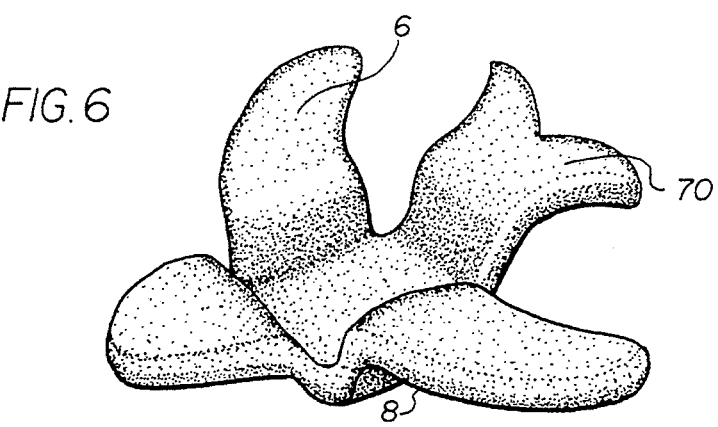

Once each blank 13 has been positioned on a complementary shaped mold 28, blank 13, which is a moldable, drapeable material, is permitted to seat on the respective vertical and horizontal interior surfaces of mold 28. In this position, the exterior-shaped surfaces of blank 13 are disposed on complementary sections of mold 28. For example, the head-like portion 20 rests on head-like portion 36 of mold 28. Similarly, blank wings 24, 26 rest on wing mold portions 44, 45 and blank tail 22 rests on wing mold portion 40. Subsequently, mold 28 with the blank seated therein is placed in an oven for baking at the appropriate temperature and the required period of time. Following baking, pastry shell 70 may be removed from mold 28 where it has the three-dimensional, self-supporting ornamental shape illustrated by the bird-like shape shown in FIG. 6.

It may be desirable to provide further decorating for baked pastry 70. For example, a jelly or the like may be inserted in the central portion of a pastry to thereby give the pastry an appearance closely resembling a flower as well as enhancing the taste thereof. Frostings or other coatings may also be applied to portions of pastry 70 to decorate the pastry as well as add flavor and decorative color. Similarly, a three-dimensional pastry shell can be molded into which a meat, fruit or vegetable filling is placed.

It will be noted that the overall shape of blank 13 is substantially larger than the overall shape of the three-dimensional mold 28. This is particularly desired inasmuch as when a blank is permitted to droop or collapse into the mold or is otherwise manually shaped to seat in the three-dimensional mold 28, the overall shape the dough blank along the x and y axes is reduced to approximately the overall shape of the mold along its respective x and y axes whereby the exterior shape of the dough blank and the corresponding exterior mating edge portions of the mold are aligned along their respective edges as the blank seats in the mold.

It has been found, for example, that the blank 13 formed in the shape of a bird as shown in FIG. 1 and the template of FIG. 2 has an overall width (y) of $5^{13}/_{16}$ inches and an approximate length (x) of 5½ inches. The corresponding measurements of the three-dimensional mold include a width (y') of approximately 4½ inches, a length (x') of approximately 4½ inches and a depth (z) of approximately 1¼ inches. Thus, when a dough blank is cut, it will have the length and width dimensions of the template; however, these dimensions become reduced when the blank seats in the mold whereby the exterior edges 82 of the dough blank become substantially aligned with the corresponding mating exterior edge portions 80 of the mold. Initially, two templates 14 can be fabricated to provide a desired decorative silhouette from a suitable material, such as a ½2 inch thick piece of copper having the requisite length and width dimensions. One template will remain as is and serve as a template 14 to form a blank 13. The remaining template will be bent to provide a central pocket or recess 30 with the wing, head and tail portions extending therefrom as illustrated, for example, in FIG. 3. In forming the pocket or recess, the overall template length and width is, of course, reduced a desired amount.

While the preferred embodiment has been described with reference to a pastry, it should be appreciated that the foregoing method and apparatus are useable for any decorative form in which the material has a plastic stage which is adapted to be rolled or formed into a sheet or slab from which one or more blanks can be removed and thereafter placed in three-dimensional mold(s) and thereafter hardened at room temperature or in a baking oven. As previously described, certain clays can be rolled, cut, and molded all in accordance with the present invention.

While the present invention has been described in connection with a single embodiment, it will be understood in those skilled in the art that many changes and modifications may be made without departing from the true spirit and scope of the invention. It is therefore intended by the appended claims to cover all such changes and modifications which come within the true spirit and scope of the invention.

What is claimed is:

1. A kit for use in forming a three-dimensional, self-supporting decorative member from a material having a plastic stage, said kit comprising:

at least one forming member having an overall length and width for forming a flat, two-dimensional blank having an exterior shape of a desired decorative member; and, at least one three-dimensional mold having a length, width and depth;

said mold having an overall length and width which are less than the overall length and width of said blank forming member; and, said mold having substantially the same exterior shape as said exterior shape of said forming member.

2. A kit in accordance with claim 1 and including a plurality of said forming members and said three-dimensional molds.

3. A kit in accordance with claim 1 wherein said forming member and said mold are each formed from a bendable copper material.

4. A kit in accordance with claim 1 wherein said forming member comprises a template having an exterior shape of the shape of said decorative member to be formed.

5. A kit in accordance with claim 1 where said forming member comprises a cutting die having an exterior shape of the shape of said decorative member to be formed.

* * * * *